United States Patent [19]

Yeh et al.

[11] Patent Number: 4,949,236
[45] Date of Patent: Aug. 14, 1990

[54] SMART CONTROLLER

[75] Inventors: Hsi-Han Yeh, Fairborn; Siva S. Banda, Dayton; Paul J. Lynch, both of Dayton, all of Ohio

[73] Assignee: United States as represented by the Secretary of the Air Force, Washington, D.C.

[21] Appl. No.: 229,590

[22] Filed: Aug. 8, 1988

[51] Int. Cl.$^5$ .................. G05B 13/00; G05B 17/00
[52] U.S. Cl. .................... 364/148; 364/553; 364/151; 364/158; 364/149
[58] Field of Search ............... 364/148, 149, 150, 151, 364/157, 158, 159, 604, 728, 819, 553, 724.01, 422

[56] References Cited

U.S. PATENT DOCUMENTS

| | | | |
|---|---|---|---|
| 3,923,166 | 12/1975 | Fletcher et al. | 214/1 CM |
| 4,279,013 | 7/1981 | Cameron et al. | G05B/13/02 |
| 4,338,659 | 7/1982 | Kurakake | G05B/13/04 |
| 4,604,581 | 8/1986 | Thadani et al. | 364/422 |
| 4,641,235 | 2/1987 | Shigemasa et al. | G05B/13/04 |
| 4,736,367 | 4/1988 | Wroblewski et al. | H01J/3/00 |
| 4,811,261 | 3/1989 | Kobayashi et al. | 364/553 |

OTHER PUBLICATIONS

Design of a Self-Optimizing Control System—by R. E. Kalman, ASME, Feb. 1958, pp. 468–478.
AFWAL-TR-85-3113 (AD-A168016), Basic Research on Adaptive Model Algogithmic Control, Larimore et al., Scientific Systems, Inc., Cambridge, Mass, Feb. 82–Jun. 85.

Primary Examiner—Jerry Smith
Assistant Examiner—Jim Trammell
Attorney, Agent, or Firm—Bernard E. Franz; Donald J. Singer

[57] ABSTRACT

The Controller is a logical network which, when interfaced with a mechanical system or an electromechanical system, will cause the output variable of the system to closely follow any command signal received. It comprises shift registers, memory banks, accumulators, arithmetic units and preferably no software. The device works in two stages. In the first stage it identifies the unit-impulse response of the system piece-by-piece while using the accumulated information to control the system at the same time. In the second stage it continually readjusts the stored information at each clock pulse by comparing the observed output signal and the command signal, while generating the required control variable based on the updated information. Its operation incorporates a learning process which emulates a simple form of human intelligence.

5 Claims, 2 Drawing Sheets

SMART CONTROLLER

RIGHTS OF THE GOVERNMENT

The invention described herein may be manufactured and used by or for the Government of the United States for all governmental purposes without the payment of any royalty

BACKGROUND OF THE INVENTION

The present invention relates generally to a Smart Controller which is an impulse-response adaptive control system; or more particularly to a logical network which when interfaced with a mechanical system or an electromechanical system, will cause the output variable of the system to closely follow any command signal received.

Model reference control algorithms are synthesized on the basis that the plant may be described by a transfer function with unknown coefficients. A basic assumption under which the stability of these algorithms is proven is that the order of the plant transfer function be known.

The uncertainty in the coefficients or parameter values of a transfer function of a given order may be referred to as structured uncertainty. Most practical systems have high frequency plant dynamics which cannot be described by transfer functions of a given order for any values of the parameters. These high frequency dynamics are called unmodelled or unstructured dynamics. Unmodelled dynamics affect the performance of model reference adaptive control systems in a peculiar way. Recent studies (C. E. Rohrs et al, "Robustness of Continuous-Time Adaptive Control Algorithms in the Presence of Unmodelled Dynamics" IEEE Transactions on Automatic Control, Vol AC-30, pp 881–889, Sept. 1985) show that in the presence of unmodelled dynamics, a model reference adaptive control system becomes unstable if the reference input contains a high frequency sinusoid. Instability also occurs if there is a sinusoidal output disturbance at any frequency including d.c. The latter poses a serious problem because sinusoidal disturbances are common and the problem cannot be alleviated by adding a low-pass filter at the output (Rohrs et al ibid.). A remedy for this problem is to add low frequency excitation of sufficient magnitude at the input (Rohrs et al ibid. and K. J. Astrom, "A Commentary on the C. E. Rohrs et al Paper . . ." IEEE Transactions on Automatic Control, Vol AC-30, pp 889, Sept. 1985). A recent study (J. Krause et al, "Robustness Studies in Adaptive Control", Proceedings 22nd, IEEE Conference Decision Control, San Antonio, Tex. Dec. 14–16, 1983, pp 977–981) also deals with the frequency range and the amount of excitation required to stabilize the adaptive control system in the presense of unmodelled dynamics and output disturbances.

Many practical systems (for example, flight control systems) exist where persistent excitation in the input signal is undesirable. Thus the problem with unmodelled dynamics reduces the appeal or even precludes the application of adaptive control to such systems R. E. Kalman ("Design of a Self-Optimizing Control System" Transactions of ASME, Vol 80, pp 468–478, Feb. 1958) mentioned the idea of modeling a plant in terms of an impulse response sequence in the design of a self-optimizing control system. However, Kalman did not succeed in developing an adaptive controller based on on-line identification of impulse-response sequence of an unknown system. In the work of Kalman, the idea of impulse-response sequence was abandoned, and his control algorithm computes the coefficients of the rational transfer function of the unknown plant via a modified least square filtering procedure, which requires lengthy and involved calculations. Kalman's machine requires a considerable amount of programmed computation. Furthermore, in Kalman's design the order of the plant must be known. Each machine is built for plants that are lower than certain order. The computation grows exponentially with the order of the plant. Because of the computation time involved, the usefulness of the Kalman machine is limited to low order plants and low-sampling frequency digitalization.

Control designs based on approximate impulse-response models have been developed See R. K Mehra et al, "Basic Research in Digital Stochastic Model Algorithmic Control" Technical Report AFWAL-TR-80-3125; and W. E. Larimore & S. Mahmood, "Basic Research on Adaptive Model Algorithmic Control", Technical Report AFWAL-TR-85-3113 (available from NTIS as AD-A168 016), both from Flight Dynamics Laboratory, Wright-Patterson Air Force Base, Ohio. An application of Model Algorithmic Control (MAC) described in the Larimore & Mahmood Report is presented in a technical report by J. V. Carroll and R. F. Gendron: "Vectored Thrust Digital Flight Control For Crew Escape", AFWAL-TR-85-3113, Vols I–IV, also from Flight Dynamics Laboratory (Vol I available from NTIS as AD-A166 580). Model Algorithmic Control (MAC), described in the Larimore & Mahmood Report assumes that the unit-impulse response sequence of the controlled system (the plant) is known. The control variable is then computed from the desired output and the unit-impulse response sequence. The Adaptive MAC requires that the unknown plant be operated open-loop and off-line initially for seven seconds to enable its unit-response be identified. The o impulse-response model is then used in the digital controller and the control loop is closed A (random) dither signal and a measurement noise of sufficient magnitude and variance are deliberately introduced and superimposed on the actual input and output to enable the repeated identification of the plant's impulse response model every seven seconds. Thus, the Adaptive MAC cannot help being contaminated by an artificially introduced dither signal at the input and measurement noise at the output and at the feedback Wroblewski et al in U.S. Pat. No. 4,736,367 describe the control of a plurality of relay drivers by smart control devices using smart sensors. A driver and receiver circuit receives, interprets and converts signals from the smart control devices and smart sensors and a microcomputer supplies continuous and updated information to a display system indicative of the status of each control device and each sensor and its associated switch. In Shigemasa et al U.S. Pat. No 4,641,235 a process control apparatus is provided with process dependent switching between two different control modes. A first mode is used for steady state and a second mode is used when the process characteristics vary frequently. Process characteristics are selected by sampling. Kugath et al in U.S. Pat. No. 3,923,166 show a master-slave mechanical system where the output closely follows the input. Cameron et al in U.S. Pat. No. 4,279,013 teach an adaptive controller for machine processes and Kurakake in U.S. Pat. No. 4,338,659 shows controlling a machine tool in accordance with position error by making a comparison between commanded positional information and detected positional information.

SUMMARY OF THE INVENTION

An object of the invention is to provide a controller which is able to control a mechanical or electromechanical system whose transfer function is partially known vaguely known, or even unknown to the control designer, and may even vary with time The invention relates to a logical network (called Smart Controller) which, when interfaced with a mechanical system or an electromechanical system, will cause the output variable of the system to closely follow any command signal received. It comprises shift registers, memory banks, accumulators arithmetic units and preferably no software The device works in two stages. In the first stage it identifies the unit-impulse response of the system piece-by-piece while using the accumulated information to control the system at the same time. In the second stage it continually readjusts the stored information at each clock pulse by comparing the observed output signal and the command signal, while generating the required control variable based on the updated information. Its operation incorporates a learning process which emulates a simple form of human intelligence.

In the preferred embodiment, the Smart Controller involves no software or programmed computation. Therefore, the computation time required after each clock pulse is in the order of nanoseconds (the time required for a signal to pass through logical gates) This makes possible the application of the Smart Controller to any practical electromechanical system with fast sampling. The main feature of the Smart Controller is that it can be applied to an arbitrary electromechanical system with unknown transfer function The Smart Controller will learn about the unknown system on the job while using the acquired information to control the system. It will adapt to the changing environment by constantly updating the acquired data when the characteristics of the unknown system are varying with time.

Kalman's machine requires a considerable amount of programmed computation, and therefore the computation time required after each clock pulse is orders of magnitude greater than what is required of the Smart Controller The speed of the Smart controller enables it to control any mechanical or electromechanical system that has minimum phase and convergent unit-impulse response sequence. The potential uses are limitless. Examples include control of aircraft and spacecraft and their subsystems, chemical and mechanical processes nuclear reactors and manufacturing equipment This technology has extremely broad applications.

DETAILED DESCRIPTION

Application of the Smart Controller to a generic aircraft model has been simulated on a digital computer, with satisfactory results. The mathematical aircraft model used was a two-degree-of-freedom short-period approximation to the longitudinal dynamics of an air-to-air medium-weight tailless delta-winged configuration, a class to which the F-16XL belongs. The results were presented in a paper by Applicants (Yeh et al) titled "An Impulse-Response Adaptive Control System" presented at the AIAA Guidance, Navigation and Control Conference, Monterey, CA, 17–20 August 1987. A related system called Universal Controller by the same applicants is covered by a copending patent application Ser. No. 07/265,383 filed Oct. 31, 1988. and is described in a paper with the same authors titled "Control of Unknown Systems Via Deconvolution", presented at the 26th IEEE Conference on Decision & Control, Los Angeles, Calif., 9–11 Dec. 1987. The two papers are hereby incorporated by reference, and copies are included with this application as filed.

Figure 1:
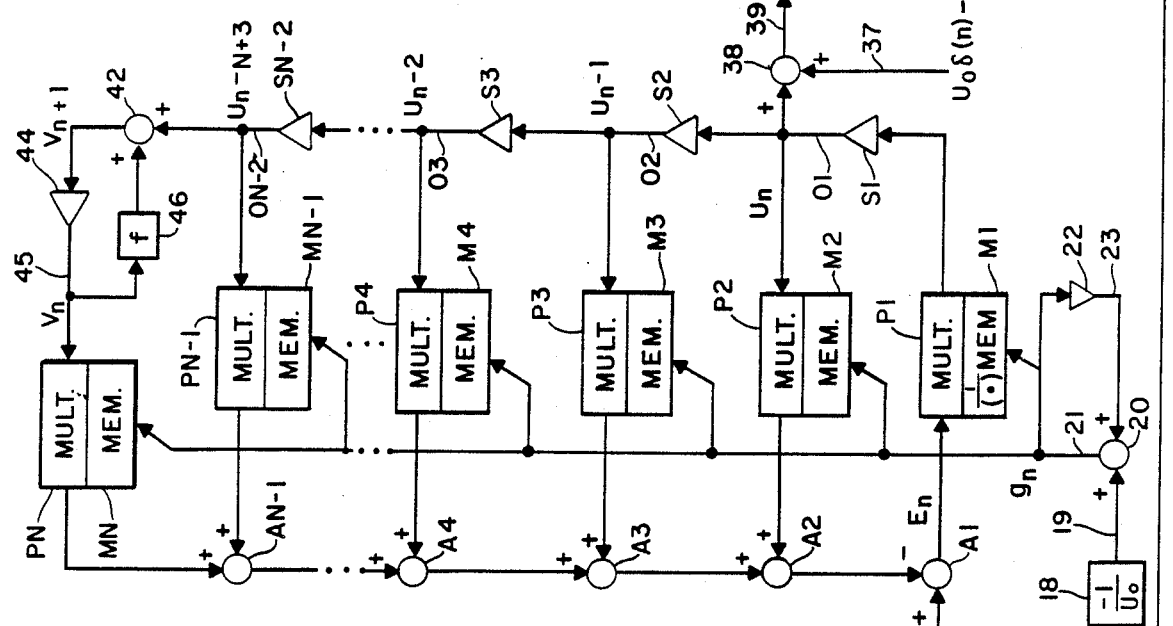
FIG. 1 is a block diagram showing the system configuration during a first stage of operation (the identification-and-control stage)
Figure 2:
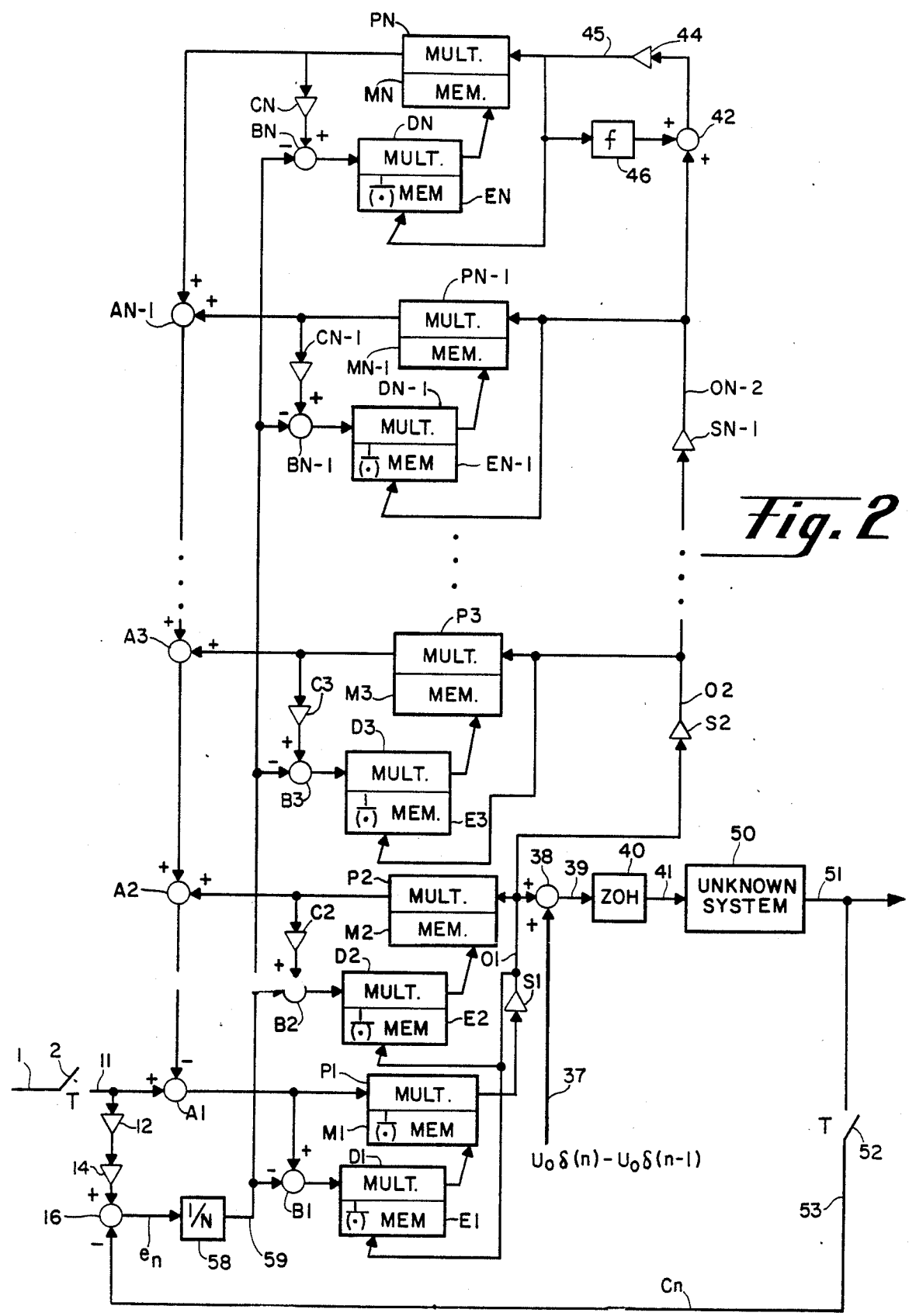
FIG. 2 is a block diagram showing the system configuration during a second stage of operation (the updating scheme).

Two stages of a logical network (synchronous sequential network) describing the Smart Controller are given in FIGS. 1 and 2, where an unknown system 50 is the plant to be controlled, and $r(n)$: the discrete-time command $c(t)$: continuous-time system output T: sampling period ZOH: zero order hold $u_o$: a parameter directly proportional to output error may be arbitrarily selected by the user $\delta(n)$: unit sample function (this function has a value equal to one only when n=0, otherwise, the value of the function is zero)

f: a constant between 0 and 1 may be adjusted for each application $\Delta$: one period delay N: number of memory storage for the unit-impulse response sequence In the identification and control stage, Smart Controller computes the unit-impulse response sequence of the unknown system and outputs it at the terminal $g_n$. Each element of the sequence is output at the corresponding sampling instant and is stored subsequently in the corresponding memory slot, except for the first slot where the inverse of $g_1$ is stored (if $g_1$ is zero then the first nonzero element of the sequence) At the same time the next-step optimal variable $u_{n+1}$ is generated by the deconvolution of the unit-impulse response sequence and the input sequence so that the output error is maintained at $$e(n) = r(n) - c(n) = u_o(g_{n-1} - g_n)$$

Since most digital control systems are sampled at far greater rates than the natural frequencies of the controlled systems, $g_{n-1} - g_n$ is small, and vanishes with increasing n if the uncontrolled system is stable. To reduce $e(n)$ further, the user may arbitrarily choose a smaller $u_o$, as long as the inverse of $u_o$ in the block diagram of FIG. 1 is not too large to implement. In this fashion, the Smart Controller makes the output of an arbitrary unknown system follow a command input signal closely in the identification and control stage When all the memory slots of the logical network are filled (n=N), the operation is switched over electronically to the update stage (FIG. 2). In this stage, the logical network adjusts the contents in each memory slot after each sampling instant i such a way that each term in the convolution sum is increased in proportion to the output error. This increases/decreases the next-step output if the error is positive/negative, and thus reduces the magnitude of the error.

Note that while the unknown system 50 is analog, the Smart Controller is digital with the devices and the lines interconnecting them handling words with binary digits in parallel, a typical word length being sixteen binary digits. A clock 100 is coupled to most of the devices of the controller to trigger their operation at intervals of T seconds. A typical value for T in avionics applications may be 40 milliseconds. Devices shown in the drawing as triangles (referred to as delay devices or shift register stages) provide a delay of one clock interval by storing a digital word at the beginning of an interval, and supplying that word at its output at the beginning of the next interval. Devices represented as circles are summing devices (adders or subtracters) which provide the arithmetic sum or difference of two input words.

THE IDENTIFIER-CONTROLLER STAGE

Referring to the first-stage block diagram of FIG. 1, the Smart Controller comprises a plurality (N) of memory locations M1, M2, M3, M4 ... MN-1, MN; with associated arithmetic multiplier units P1, P2, P3, P4 ... PN-1, PN. A shift register comprises N-2 serial stages S1, S2, S3, ... SN-2. The outputs of the shift register stages on respective lines 01 02, 03, ... ON-2 are each (except the last one) coupled to the input of the next stage, and also to the inputs of the multiplier devices P2, P3, P4 ... PN-1 respectively The output of the last shift register stage on line ON-2 is coupled via a summing device 42 a delay unit 44 and line 45 to the input of the multiplier device PN, with line 45 also coupled via a device 46 which provides multiplication by a forgetting factor f to a plus input of the summing device 42. (A forgetting factor is a number between 0 and 1, tuned to the particular unknown system being controlled. For lack of a priori information on the controlled system, the forgetting factor is usually taken as 0.5. (Note that the input of stage S2 and the input of memory P2 could be connected to line 39 at the output of the summing device 38 instead of to line 01, with no difference in the operation.)

There are a number of arithmetic summing devices, including device A1 having its output coupled to the input of the multiplier device P1, and summing devices A2, A3, ... AN-1 having plus inputs from outputs of the respective multiplier devices P2, P3, ... PN-1. with the summing device AN-1 having another plus input from the output of the multiplier PN. Summing device A1 is a subtracter which has a minus input from the output of device A2, and devices A2, A3, ... AN-2 have plus inputs from the outputs of devices A3, ... AN-1, respectively. The summing device A1 has a plus input coupled to a command input line 11. A summing device 38 has one plus input from the output of the first shift register stage S1 on line 01, and another plus input from line 37. The signal supplied at line 37 by a circuit (not shown) has value of $u_O$ at the initial clock pulse (n=0), a value of $-u_O$ at the next clock pulse (n=1) and is zero thereafter Mathematically this is denoted by ($u_0 \delta(n) - u_0 \delta(n-1)$).

The output of the summing device 38 on line 39 is supplied via a zero order hold device 40 and line 41 to an input of the unknown system 50. The zero order hold device is a circuit which responds to a digital input signal at the beginning of each clock interval, converts the value of the digital word to an analog voltage level, and then holds its output constant at that voltage level for the duration of the clock interval. The analog signal on line 41 is the control signal of system 50, which responds with an analog output signal on line 51.

The output on line 51 is sampled by a device 52, shown as a switch, which includes an analog-to-digital converter. The analog signal is sampled at the occurrence of each clock pulse at intervals T. The resulting digital word appears with the binary digits in parallel on line 53. This digital word, signal $c_n$, is the feedback input to the Smart Controller, and is supplied to a minus input of a summing device 16. A digital command signal on line 11 is supplied via two delay devices 12 and 14 in tandem to plus input of the summing device 16. The output of the summing device 16 on line 17 is the error signal $e_n$, and is multiplied in a device 18 by the value $-1/u_0$ and supplied via line 19 to a plus input of a summing device 20 The output of the summing device 20 on line 21, designated $g_n$, is fed back via a delay device 22 and line 23 to another plus input. The output line 21 from the summing device 20 may be considered an "identification terminal", and the signal $g_n$ as an identification value. The first non-zero value of the signal on line 21 is stored in memory M1 in inverted form as $1/g_1$, and on successive clock pulses the values are stored (without inversion) as words $g_2, g_3, g_4, \ldots g_{N-1}, g_N$ in the memories M2, M3, M4 ... MN-1, MN respectively. This requires some sort of steering circuit arrangement (not shown) controlled by the clock to steer the successive, words into the proper memory locations.

Figure 1B:
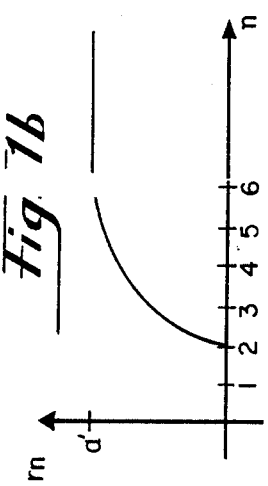
FIG. 1b is a graph showing the response to a step function at the initial time.
Figure 1A:
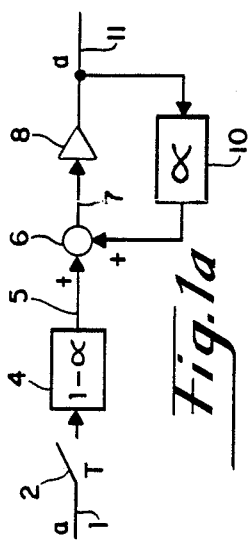
FIG. 1a is a functional block diagram of an optional input circuit for smoothing the command signal.

A functional block diagram of an optional input circuit for smoothing the command signal is shown in FIG. 1a. The analog command signal a' is received on line 1, and converted to digital form by device 2 (similar to device 52). The digital word is then multiplied by a value $(1-\alpha)$ in device 4, and supplied to a plus input of a summing device 6. The output of device 6 is delayed one clock interval in device 8 and supplied to the line 11. The signal on line 11 is multiplied by the value $\alpha$ in device 10 and supplied to a plus input of the summing device 6. The signal (a) on line 11, delayed by two clock intervals in FIG. 1 and supplied to line 15, is the discrete-time command input $r_n$. The value $\alpha$ (between 0 & 1) is the inverse of a time constant, where a small value of $\alpha$ provides a fast rise. FIG. 1b is a graph of $r_n$ as a function of n, showing the response to a step function in which the input on line 1 goes from zero to a' at the initial time. The circuit of FIG. 1a prevents a sudden change of input command to the Smart Controller.

As shown by equation (22) in the paper by Applicants (Yeh et al) titled "An Impulse-Response Adaptive Control System" presented at the AIAA Guidance, Navigation and Control Conference, Monterey Calif., 17-20 August 1987; the input-output relation of the system for the value $u_n$ on line 39 and the value $c_n$ on line 53 is a summation which can be written $$c_n = g_1 u_{n-1} + g_2 u_{n-2} + g_3 u_{n-3} + \cdots + g_{n-1} u_1 + g_n u_0$$

where $g_1, g_2, \ldots, g_n$ are unknown characteristics of the unknown system 50 being controlled, and are to be computed by the identifier piece-by-piece.

To explain the operation, it will be assumed that the circuit of FIG. 1a is used with the step function of value a'. Just after the initial time (t=0+), the signal at the output of the device 6 is $(1-\alpha)a'$. All the other signal levels are zero, including $r_n$ on line 15, $c_n$ on line 53, $e_n$ on line 17, and the contents of all of the memory locations and the shift register, except (or the inputs from line 37 to lines 39 and 41. Here the value $u_O$ is supplied from line 37 via device 38 to line 39, converted to analog form in the device 40 and applied at line 41 as the input command to the system 50.

After the first clock pulse (n=1 and t=T+), the signal $(1-\alpha)a'$ which appears on line 11 is multiplied by $\alpha$ and added to the input $(1-\alpha)a'$ to become $(1-\alpha^2)a'$ at line 7. The signal $r_n$ at line 15 is still zero. The signal $u_O$ has been applied to the system 50 for one sampling period T, providing the value $(c_1 = g_1 u_O)$ on line 53 at the minus input of the summing device 16. The value of $e_1$ on line 17 is $(-g_1 u_O)$, so that the signal at lines 19 and 21 is $g_1$. The value loaded into the memory location $M_1$ is $1/g_1$. Since the output of device A2 is still zero, the command signal $(1-\alpha)a'$ on line 11 appears via device A1 at the input of the multiplier P1, is multiplied by the word in memory M1, and is delayed by one time interval in device S1 to provide the signal $(u_2 = (1-\alpha)a'/g_1)$ on line 01 for the next time. The signal from line 37 is now $-u_O$.

After the second clock pulse (n=2 and t=2T+) the signal on line 11 becomes $(1-\alpha^2)a'$, the signal at the output of device 12 i $(1-\alpha)a'$, and the signal $r_n$ at line 15 is still zero. The signal on line 53 at the minus input of the summing device 16 is $$c_2 = g_2 u_0 + g_1 u_1,$$

where $g_1$ has been computed but $g_2$ is still unknown. Substituting $u_1 = -u_0$ and taking the negative gives on line 17

$$e_2 = -c_2 = -(g_2 u_0 - g_1 u_0) = u_0(g_1 - g_2),$$

and the signal at line 19 is $(g_2 - g_1)$. The previous value $g_1$ from line 21 now appears at the output of device 22 on line 23 and is added to the value $(g_2 - g_1)$ to give the value $g_2$ on line 21. This value $g_2$ is loaded into memory location M2. The signal on line 01 is now $u_2 = (1-\alpha)a'/g_1$ and is applied at the input of the multiplier P2 (this signal $u_2$ also appears on line 39, since the signal on line 37 is now zero and remains zero). The output of the multiplier P2 is $g_2 u_2$, and is applied via the summing device A2 to the minus input of the summing device A1. The command signal $(1-\alpha^2)a'$ on line 11 is added thereto to give $((1-\alpha^2)a' - g_2 u_2)$ at the input of the multiplier P1, and the output of the multiplier P1 gives $$u_3 = ((1-\alpha^2)a' - g_2 u_2)/g_1$$

which will appear on line 01 and line 39 for the next clock time.

After the third clock pulse (n=3 and t=3T+), the signal on line 11 becomes $(1-\alpha^3)a'$, the signal at the output of device 12 is $(1-\alpha^2)a'$, and the signal $r_3$ at line 15 is $(1-\alpha)a'$. The signal on line 53 at the minus input of the summing device 16 is $$c_3 = g_3 u_0 + g_2 u_1 + g_1 u_2,$$

where $g_3$ is still unknown. Substituting $$u_2 = ((1-\alpha)a'/g_1), u_1 = -u_0,$$

and summing in device 16 gives on line 17

$$e_3 = r_3 - c_3 = (1-\alpha)a' - (g_3 u_0 - g_2 u_0 + (1-\alpha)a')$$
$$= g_2 u_0 - g_3 u_0$$

and the signal at line 19 is $(g_3 - g_2)$. The previous value $g_2$ from line 21 now appears at the output of device 22 on line 23 and is added to the value $(g_3 - g_2)$ to give the value $g_3$ on line 21. This value $g_3$ is loaded into the memory location M3. The signal on line 01 is now $u_3$ and is applied at the input of the multiplier P2. The output of the multiplier P2 is $g_2 u_3$, and the output of the multiplier P3 is $g_3 u_2$, so the minus input of the summing device A1 is $-(g_3 u_2 + g_2 u_3)$. The command signal $(1-\alpha^3)a'$ on line 11 is added thereto to give $((1-\alpha^3)a' - (g_3 u_2 + g_2 u_3))$ at the input of the multiplier P1, and the output of the multiplier P1 gives $$(u_4 = ((1-\alpha^2)a' - (g_3 u_2 + g_2 u_3))/g_1)$$

which will appear on line 01 and line 39 for the next clock time.

The above operation continues in response to successive clock pulses, until n is equal to N and t equals nT+. The memory locations M2, M3, M4 ... MN-1 MN then will contain the digital words with values $g_2, g_3, g_4 \ldots g_{N-1}, g_N$ respectively, with the word in memory location M1 being $1/g_1$. The values of $u_n$ have propagated through the shift register from device S1 through device SN-2 and the signal on line ON-2 is now $u_3$. If f=1 for the multiplying device 46, the value on line 45 at the input of the multiplier PN is $u_2$. The outputs (in general a combination of positive and negative values) of all of the multiplier devices P2 to PN are summed together and the sum applied to the minus inputs of the summing device A1.

THE UPDATING STAGE

When all the memory slots of the logical network are filled (n=N). the operation is switched over electronically to the update stage (FIG.2). In this stage, the logical network adjusts the contents in each memory slot after each sampling instant in such a way that each term in the convolution sum is increased in proportion to the output error This increases/decreases the next-step output if the error is positive/negative, and thus reduces the magnitude of the error.

Referring to the second-stage block diagram of FIG. 2, the Smart Controller in the update configuration still includes the memory locations M1, M2, M3, M4 ... MN-1, MN; the associated arithmetic multiplier units P1, P2, P3, P4 ... PN-1, PN; the shift register serial stages S1, S2, S3, ... SN-2; the summing device 42; delay unit 44; attenuation device 46; and summing devices A1, A2, A3, ... AN-1; all connected as in stage 1 except for the inputs to the memory locations Also the command line 11 is connected to the summing device A1, the output of stage S1 is coupled via a summing device 38 and a zero order hold device 40 to an input of the unknown system 50, and the output on line 51 is sampled by the device 52 and supplied to a minus input of the summing device 16, as in stage 1. The digital command signal on line 11 is still supplied via two delay devices 12 and 14 in tandem to the plus input of the summing device 16. The starter signal on line 37 is now zero since n is greater than N The input command line 1 and sampling device 2 can either be connected directly to line 11, or through the smoothing device of FIG. 1a to line 11. The configuration of FIG. 2, in addition comprises a plurality (N) of memory locations E1, E2, E3, ... EN-1 EN; with associated arithmetic multiplier units D1, D2, D3, ... DN-1, DN. The output of summing device 16 is multiplied by a factor b=(1/N) in a device 58 and supplied via a line 59 to minus inputs of a plurality of summing devices B1, B2, B3, ... BN-1, BN. The line to the input of the multiplier P1 is coupled directly to a plus input of the summing device B1, and the lines from the outputs of the multipliers P2, P3, ... PN-1, PN are coupled via respective delay devices C2, C3, ... CN-1, CN to plus inputs of the summing devices B2, B3 ... BN-1, BN respectively. The line 01 is coupled to the inputs of the memory locations E1 and E2; and the lines to the inputs of multiplier units P3, ... PN-1, PN are also coupled to the inputs of the memory locations E3, ... EN-1, EN respectively. The outputs of the multiplier units D1, D2, D3, ... DN-1, DN are connected to the inputs of the memory locations M1, M2, M3, ... MN-1, MN respectively. A number of synchronous electronic switching devices (not shown) are used to change from the configuration of FIG. 1 to the configuration of FIG. 2, actuated during the interval between the clock pulses at n=N and n=N+1, in response to a word being stored in the memory location MN from line 21 in FIG. 1.

In the operation after switching over to the update stage, the logical network adjusts the contents in each memory slot M1, M2, M3, ... MN-1, MN after each clock pulse. The input signal words to the memory slots E1, E2, E3, ... EN-1, EN are stored in inverted form. Thus the word $u_n$ on line 01 is stored as $1/u_n$ in memory locations E1 and E2, the word $u_{n-1}$ on line 02 is stored as $1/u_{n-1}$ in memory location E3, and so on up to the word $u_{n-N+3}$ on line ON-2 being stored as $1/u_{n-N+3}$ in memory locations EN-1, and the word $v_n$ on line 45 being stored as $1/v_n$ in memory locations EN in response to the clock pulse nT.

The digitized feedback signal $c_n$ on line 53 is subtracted in device 16 from the command signal $r_n$ delayed two clock intervals by devices 12 and 14 to provide the error signal $e_n$ which is multiplied by the factor 1/N and supplied to the minus inputs of the summing devices B1, B2, B3, ... BN-1, BN. In each feedback loop, there must be at least a time delay to account for the computation time which is provided in FIG. 2 by the devices C2, C3, ... CN-1, CN. (Note that there is no device C1, as the multipliers P1 and D1 are not in a feedback loop.) The outputs of the summing devices B1, B2, B3, ... BN-1, BN are multiplied in devices D1, D2, D3, ... DN-1, DN respectively by the contents of the memory slots E1, E2, E3, ... EN-1, EN respectively to update the contents of the memory slots M1, M2, M3, M4 ... MN-1, MN respectively. The result is that each term in the convolution sum is increased in proportion to the output error. This increases the next-steP outPut if the error is positive, and decreases it if the error is negative, and thus reduces the maqnitude of the error.

ALTERNATIVES

Functions of the synchronous sequential network can also be realized by a microprocessor or a computer. In a microprocessor or computer realization, software or programmed computation is involved. The computation time required to generate the control variable for each sampling period is orders of magnitude longer than that of the logical network. The software version is also prone to numerical errors. The usefulness of the software version is thus limited to systems with low natural frequencies so that the sampling period can be long and the number of memory slots required for the impulse-response sequence can be few.

It is understood that certain modifications to the invention as described may be made, as might occur to one with skill in the field of the invention, within the scope of the appended claims. Therefore, all embodiments contemplated hereunder which achieve the objects of the present invention have not been shown in complete detail. Other embodiments may be developed without departing from the scope of the appended claims.

What is claimed is:

1. A controller for controlling a system whose transfer function is partially known, vaguely known, or even unknown to the control designer, and may even vary with time, a continuous-time system output signal c(t) on a system output being a function of said transfer, function and a continuous control input signal u(t) on a system input line;

wherein said controller comprises digital apparatus operating on signals in the form of digital words having a predetermined number of binary digits, including a source of clock pulses recurring at intervals equal to a sampling period T, a number (n) being the number of clock intervals from an initial time zero, sampling means coupled to said system output line for converting said continuous-time system output signal c(t) to digital system output signals $c_n$ comprising digital words occurring at time nT on a feedback line, a command line on which command signals are supplied as digital words, a controller input line, a reference input line, the command line being coupled to the controller input line and to the reference input line with delay means which provides that signals at the command line appear at the reference input line with a delay of two clock intervals T relative to the time of appearance at the controller input line, a controller output line, the input of the controller at the controller output line being a control sequence of control signal $u_n$ which is converted to the continuous signal u(t) at said system input line, starter means for applying a digital starter signal at said controller output line, said starter signal having a nonzero value only for a given number of clock intervals beginning with the initial time;

the signals from the command line at the reference input line being reference signals $r_n$ occurring at times nT, error detection means having inputs from the reference input line and the feedback line and output to an error line for subtracting the digital system output signals $c_n$ from the reference signals $r_n$ to provide error signals $e_n$ at the error line;

said controller having a first configuration including identifier means and control means, operative during an identification and control stage;

wherein the identifier means comprises means coupled between the error line and an identification terminal to compute a unit-impulse response sequence of the said system and output it as a sequence of identification signals $g_n$ at the identification terminal;

wherein the control means comprises N memory locations Mn (n=1 to N) which at the initial time have words of value zero stored therein, the memory locations being coupled to the identification terminal to store the sequence of identification signals $g_n$, with each element $g_n$ of the sequence output at the corresponding sampling instant and stored subsequently in the corresponding memory location Mn, except for the first memory location where the inverse of $g_1$ is stored (if $g_1$ is zero, then the first nonzero element of the sequence), means including shift-register means and arithmetic means coupled between the controller input line and the controller output line with connections to the memory locations, for generating a sequence of next-step control signals $u_{n+1}$ which will cause the system output to follow the reference input closely, each control signal $u_{n+1}$ being generated during the time $nT^+$ that the corresponding identification signal $g_n$ ($g_2$ to $g_N$) is being stored in the corresponding memory location Mn;

said controller further having a second configuration comprising update means coupled to said control means and to said error line, said identifier means being excluded from the second configuration, the controller being switched from the first configuration to the second configuration in response to the Nth memory location MN having the work $g_N$ stored therein, so that the second configuration is operative for clock intervals greater than NT, wherein the update means comprises means for causing the controller to adjust the contents in each memory location after each sampling instant in such a way that each term in the convolution sum of the control sequence and the unit-impulse response sequence is increased in proportion to the error signal, which increases the next-step output if the error signal is positive and decreases the next-step output if the error signal is negative, and thus reduces the magnitude of the error signal.

2. A controller for controlling a system whose transfer function is partially known, vaguely known, or even unknown to the control designer, and may even vary with time, a continuous-time system output signal c(t) on a system output line being a function of said transfer function and a continuous control input signal u(t) on a system input line;

wherein said controller comprises digital apparatus operating on signals in the form of digital words having a predetermined number of binary digits, including a source of clock pulses recurring at intervals equal to a sampling period T, a number (n) being the number of clock intervals from an initial time zero, sampling means coupled to said system output line for converting said continuous-time system output signal c(t) to digital system output signals $c_n$ comprising digital words occurring at times nT on a feedback line, a command line on which command signals are supplied as digital words, a controller input line, a reference input line, the command line being coupled to the controller input line and to the reference input line with delay means which provides that signals at the command line appear at the reference input line with a delay of two clock intervals T relative to the time of appearance at the controller input line, a controller output line, the output of the controller at the controller output line being a control sequence of control signal $u_n$ which is converted to the continuous signal u(t) at said system input line, starter means for applying a digital starter signal at said controller output line, said starter signal having a nonzero value only for a given number of clock intervals beginning with the initial time;

the signals from the command line at the reference input line being reference signals $r_n$ occurring at times nT, error detection means having inputs from the reference input line and the feedback line and output to an error line for subtracting the digital system output signals $c_n$ from the reference signals $r_n$ to provide error signals $e_n$ at the error line;

said controller having a first configuration including identifier means and control means, operative during an identification and control stage;

wherein the identifier means comprises means coupled between the error line and an identification terminal to compute a unit-impulse sequence of the said system and output it as a sequence of identification signals $g_n$ at the identification terminal;

wherein the control means comprises N memory locations Mn (n=1 to N) which at the initial time have words of value zero stored therein, the memory locations being coupled to the identification terminal to store the sequence of identification signals $g_n$, with each element $g_n$ of the sequence output at the corresponding sampling instant and stored subsequently in the corresponding memory location Mn, except for the first memory location where the inverse of $g_1$ is stored (if $g_1$ is zero, then the first nonzero element of the sequence), means including shift-register means and arithmetic means coupled between the controller input line and the controller output line with connections to the memory locations, for generating a sequence of next-step control signals $u_{n+1}$ by deconvolution of the unit-impulse response sequence and the input signal sequence, each control signal $u_{n+1}$ being generated during the time $nT^+$ that the corresponding identification signal $g_n$ ($g_2$ to $g_N$) is being stored in the corresponding memory location Mn;

said controller further having a second configuration comprising update means coupled to said control means and to said error line, said identifier means being excluded from the second configuration, the controller being switched from the first configuration to the second configuration in response to the Nth memory location MN having the word $g_N$ stored therein, so that the second configuration is operative for clock intervals greater than NT, wherein the update means comprises means for causing the controller to adjust the contents in each memory location after each sampling instant in such a way that each term in the convolution sum of the control sequence and the unit-impulse response sequence is increased in proportion to the error signal, which increases the next-step output if the error signal is positive and decreases the next-step output if the error signal is negative, and thus reduces the magnitude of the error signal;

wherein said controller includes delay units, each of which is an IC circuit for storing one digital word with parallel inputs and parallel outputs triggered by a clock pulse to store a word from the inputs which then is present at the outputs until the next clock pulse to thereby provide a delay of one clock interval;

wherein the command line is coupled directly to the controller input line and is coupled to the reference input line via two of said delay units in tandem to provide a delay equal to two clock intervals;

wherein said starter signal has a value equal to $u_0$ at the initial time, a value equal to $-u_0$ at time T, and a value of zero at time 2T and after, $u_0$ being a predetermined parameter; and wherein said identifier means comprises one of said delay units having its inputs coupled to the identification terminal and its outputs to a delayed-identification line so that the signal at its inputs from the identification terminal is $g_n$ and the signal at its outputs to the delayed-identification line is $g_{n-1}$, and means having inputs from the error line and the delayed-identification line and output to the identification terminal for multiplying the error signal by a value $(-1/u_0)$ and adding the result to the signal $g_{n-1}$ to thereby perform the operation $$g_n = e_n(-1/u_0) + (g_{n-1}).$$

3. A controller according to claim 2, wherein said shaft register means comprises (N-2) of said delay units in tandem to provide (N-2) shift-register stages, said arithmetic means of the control means comprises N multiplier circuits one to N inclusive, adder circuits two to N-1 inclusive and a subtracter circuit, the subtracter circuit having a plus input connected to the controller input line, the adder circuits being connected in tandem with each adder circuit having an output connected to an input of the next lower numbered adder circuit, except that the output of adder circuit number two is connected to a minus input of the subtracter circuit, the multiplier circuits being each coupled to the respective memory location to multiply the contents of the corresponding memory location by a signal word at a multiplier input and supply the product to a multiplier output, the subtracter circuit having an output connected to the input of the first multiplier circuit, the output of each of the multiplier circuits two to (N-1) being connected to an input of the corresponding adder circuit, the output of the multiplier circuit N being connected to another input of the adder circuit (N-1), the output of the first multiplier circuit being connected to the input of the first shift-register stage, the output of the first shift-register stage being coupled to the controller output line, the output of each shift register stage being connected to the input of the next higher numbered multiplier circuit, the output of the shift-register stage (N-2) being coupled via an adder circuit and one of said delay units in tandem to the input of the multiplier circuit N, with the output of the last said delay unit coupled to another input of the last said adder circuit via a circuit for multiplying by a factor f (f being a constant between 0 and 1 ).

4. A controller according to claim 3, wherein said update means (FIG. 2) comprises a set of update memory locations one to N inclusive (E1, E2, E3, ... EN-1, EN), the input of the first update memory location being coupled to the output of the first shift-register stage for inverting the output word from the first shift-register stage and storing the result in the first update memory location, the inputs of the update memory locations two to N inclusive being coupled to respective inputs of the multiplier circuits two to N inclusive of the control means for inverting the words and storing the results in the corresponding update memory locations, update subtracter circuits one to N inclusive (B1, B2, B3, ... BN-1, BN), the output of said subtracter circuit (A1) of the control means being connected to a plus input of the first update subtracter circuit (B1), N-1) of said delay units being update delay units two to N inclusive (C2, C3, ... CN-1, CN) connected respectively from the outputs of the multiplier circuits two to N inclusive (P2, P3, ... PN-1, PN) of the control means to plus inputs of the update subtracter circuits two to N inclusive, means coupled from said error line to minus inputs of all of the update subtracter circuits for multiplying the error signal by a factor (1/N) for input to the subtracter circuits, the update memory locations having individually associated update multiplier circuits one to N inclusive, each connected to multiply a word stored in the corresponding update memory location by a word at its input and to supply the resulting product as a word at its output, the update subtracter circuits one to inclusive N having outputs connected to the inputs of the respective update multiplier circuits, the outputs of the update multiplier circuits being coupled to respective inputs of the corresponding memory locations of the control means to store the words, with the word to the first memory location of the control means being inverted.

5. A method for controlling a system without prior knowledge of the system transfer function, using digital operations initiated by clock pulses recurring at intervals equal to a sampling period T, a number (n) being the number of clock intervals from an initial time zero, operating on digital command signal words to supply digital control signal words $u_n$ which are converted to continuous control system input signals u(t), continuous-time system output signals c(t) being a function of said transfer function and the control signals u(t), the system output signal c(t) being sampled at intervals equal to the sampling period T and converted to digital system output signals $c_n$ comprising digital words occurring at clock times nT, wherein said method comprises the steps:

supplying a digital starter signal as the digital control signal words $u_n$ with a value $u_0$ at the initial time, a value $u_1 = -u_0$ at time T, and a value zero at and after the time 2T;

using the command signals to provide controller input signals $a_n$ and reference signals $r_n$, with the reference signals $r_n$ delayed two clock intervals T relative to the controller input signals $a_n$;

subtracting the digital system output signals $c_n$ from the reference signals $r_n$ to provide error signals $e_n$;

computing a unit-impulse response sequence of said system to provide a sequence of identification signals $g_n$, where at the time $T^+$, $$g_1 = e_1(-1/u_0),$$

and thereafter $$g_n = e_n(-1/u_0) + (g_{n-1});$$

storing functions of the identification signals $g_n$ at times $nT^+$ at memory locations $M_n$ ($n=1$ to $N$) which at the initial time have words of value zero stored therein;

generating a sequence of next-step control signals $u_{n+1}$ which will cause the system output to follow the reference input closely, using the contents of the memory locations and the controller input signals $a_n$, each control signal $u_{n+1}$ being generated during the time $nT^+$, the control signal $u_2$ being generated during the time $T^+$ as $$u_2 = a_1/g_1,$$

the values of $u_n$ being stored so that the sequence of values $u_0$ to $u_n$ are available at the times $nT^+$, and the next-step control $$u_{n+1} = E_n/g_1,$$

where $$E_n = a_n - (g_2 u_n + g_3 u_{n-1} + \ldots + g_{N-1} u_{n-N+3} + g_N u_{n-N+2}) \text{ until } n = N;$$

updating the contents of the memory locations $M_n$ when n is greater than N, to adjust the contents in each memory location after each sampling instant in such a way that the next-step output is increased by an amount proportional to the error signal if the error signal is positive, and that the next-step output is decreased by an amount proportional to the error if the error signal is negative, and thus reduces the magnitude of the error signal.

* * * * *

UNITED STATES PATENT AND TRADEMARK OFFICE
CERTIFICATE OF CORRECTION

PATENT NO. : 4,949,236

DATED : August 14, 1990

INVENTOR(S) : Hsi-Han Yeh et al

It is certified that error appears in the above-identified patent and that said Letters Patent is hereby corrected as shown below:

```
Col 1, line  8, insert a period after "royalty".
Col 1, line 13, insert a comma after "network".
Col 1, line 62, insert a period after "systems".
Col 2, line 17, insert a period after "developed".
Col 2, line 17, insert a period after "K".
Col 2, line 39, after "The" delete "o".
Col 2, line 41, insert a period after "closed".
Col 2, line 49, insert a period after "feedback".
Col 3, line 13, insert a period after "time".
Col 3, line 19, insert a comma after "accumulators".
Col 3, line 20, insert a period after "software".
Col 3, line 35, insert a period after "gates)".
Col 3, line 40, insert a period after "function".
Col 3, line 41, insert a comma after "job".
Col 3, line 50, insert a period after "Controller".
Col 3, line 57, insert a period after "equipment".
Col 4, line 50, insert a comma after "zero".
Col 4, line 51, insert a period after "sequence)".
Col 4, line 68, insert a period after "stage".
Col 5, line  5, "i" should read ---in---.
Col 5, line 36, insert a comma after "respectively".
Col 5, line 38, insert a comma after "42".
Col 5, line 67, insert a period after "thereafter".
Col 6, line 25, insert a period after "20", first occurrence.
Col 6, line 37, after "successive" delete comma.
Col 7, line 10, "(or the" should read ---(for the---.
Col 8, line 46, "(n=N)." should read ---(n=N),---.
Col 8, line 51, insert a period after "error".
Col 8, line 62, insert a period after "locations".
Col 9, line  4, insert a period after "N".
```

UNITED STATES PATENT AND TRADEMARK OFFICE
CERTIFICATE OF CORRECTION

PATENT NO. : 4,949,236

DATED : August 14, 1990

INVENTOR(S) : Hsi-Han Yeh et al

It is certified that error appears in the above-identified patent and that said Letters Patent is hereby corrected as shown below:

```
Col  9, line 66, "next-steP outPut" should read
        ---next-step output---.
Col  9, line 68, "maqnitude" should read ---magnitude---.
Col 10, claim 1, line 51, "input" should read ---output---.
Col 11, claim 1, line 34,  "work" should read ---word---.
Col 12, claim 2, line 25, "unit-impulse sequence" should read
        ---unit-impulse response sequence---.
Col 13, claim 3, line 29, "shaft" should read ---shift---.
Col 14, claim 4, line 11, "(B1), N-1)" should read
        ---(B1), (N-1)---.
```

Signed and Sealed this

Twelfth Day of May, 1992

*Attest:*

DOUGLAS B. COMER

*Attesting Officer*      Acting Commissioner of Patents and Trademarks